(12) United States Patent
Srinivas et al.

(10) Patent No.: US 8,718,534 B2
(45) Date of Patent: May 6, 2014

(54) SYSTEM FOR CO-CLUSTERING OF STUDENT ASSESSMENT DATA

(75) Inventors: Sharath Srinivas, Webster, NY (US);
Eric Scott Hamby, Webster, NY (US);
Robert M. Lofthus, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 13 days.

(21) Appl. No.: 13/214,358

(22) Filed: Aug. 22, 2011

(65) Prior Publication Data
US 2013/0052628 A1 Feb. 28, 2013

(51) Int. Cl.
*G09B 3/00* (2006.01)

(52) U.S. Cl.
USPC ........... 434/350; 434/322; 434/323; 434/353; 434/362; 434/365

(58) Field of Classification Search
USPC .................. 434/322, 323, 350, 353, 362, 365
See application file for complete search history.

(56) References Cited

U.S. PATENT DOCUMENTS

| | | | | |
|---|---|---|---|---|
| 6,484,010 | B1* | 11/2002 | Sheehan | 434/362 |
| 7,945,668 | B1* | 5/2011 | Nucci et al. | 709/225 |
| 2002/0160350 | A1* | 10/2002 | Tanaka et al. | 434/350 |
| 2003/0134261 | A1* | 7/2003 | Jennen et al. | 434/354 |
| 2004/0202987 | A1* | 10/2004 | Scheuring et al. | 434/118 |
| 2005/0131897 | A1* | 6/2005 | Grasso et al. | 707/6 |
| 2005/0244802 | A1* | 11/2005 | MacIlroy et al. | 434/322 |
| 2006/0078863 | A1* | 4/2006 | Coleman et al. | 434/322 |
| 2007/0031801 | A1* | 2/2007 | Tidwell-Scheuring et al. | 434/322 |
| 2007/0263925 | A1* | 11/2007 | Kondo | 382/155 |
| 2008/0038705 | A1* | 2/2008 | Kerns et al. | 434/309 |
| 2008/0038708 | A1* | 2/2008 | Slivka et al. | 434/350 |
| 2008/0241810 | A1* | 10/2008 | Flores | 434/350 |
| 2009/0204634 | A1* | 8/2009 | Yoshii et al. | 707/103 R |
| 2009/0210533 | A1* | 8/2009 | Verhaegh et al. | 709/226 |
| 2009/0307049 | A1* | 12/2009 | Elliott et al. | 705/10 |
| 2010/0157345 | A1 | 6/2010 | Lofthus et al. | |
| 2010/0159432 | A1* | 6/2010 | German et al. | 434/350 |
| 2010/0159437 | A1* | 6/2010 | German et al. | 434/433 |
| 2010/0159438 | A1* | 6/2010 | German et al. | 434/433 |
| 2010/0169328 | A1* | 7/2010 | Hangartner | 707/751 |
| 2010/0227306 | A1* | 9/2010 | Lofthus et al. | 434/350 |
| 2011/0041184 | A1* | 2/2011 | Cormode et al. | 726/26 |
| 2011/0246537 | A1* | 10/2011 | Labbi et al. | 707/805 |
| 2012/0005238 | A1* | 1/2012 | Jebara et al. | 707/798 |
| 2012/0141967 | A1* | 6/2012 | German et al. | 434/350 |
| 2012/0288841 | A1* | 11/2012 | Srinivas et al. | 434/350 |

* cited by examiner

*Primary Examiner* — Jack Yip
(74) *Attorney, Agent, or Firm* — Fay Sharpe LLP

(57) ABSTRACT

A system and method for making use of formative assessment data collected is disclosed that identifies clusters of students and concurrently determines the characteristics of the student clusters. A decomposition of the data is performed with spectral theories of graphs and fuzzy logic algorithms to identify the clusters of students, clusters of assessment data and relationships between them. An actionable output is presented to teachers for the evaluation of educational progress.

5 Claims, 8 Drawing Sheets

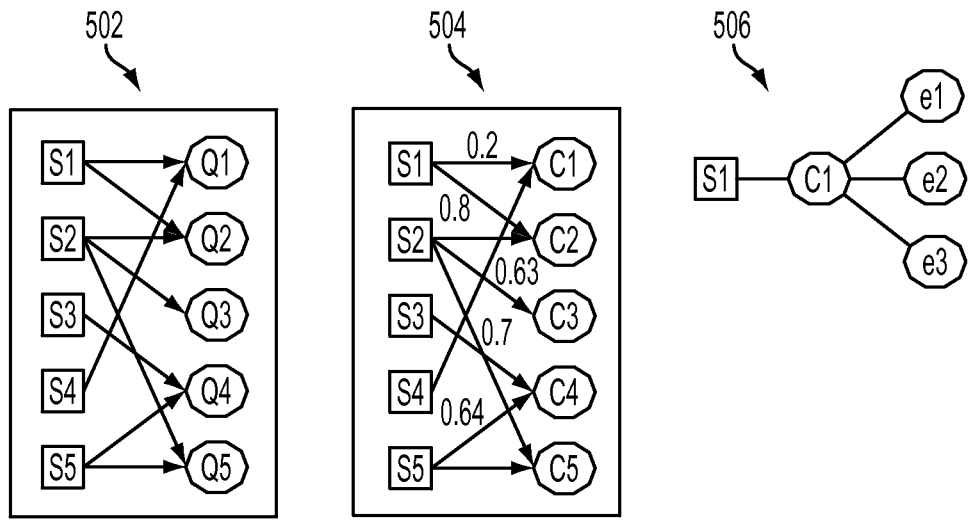

FIG. 5

```
FUNCTION SPECTRAL DECOMPOSITION
    INPUTS:
        1. THE NUMBER OF DESIRED CLUSTERS, K
        2. STUDENT-ITEM ADJACENCY MATRIX, A
    PROCEDURE:
        1. D = DIAGONAL MATRIX, WHOSE (i,i)-ELEMENT IS THE SUM OF THE i-TH ROW OF A
        2. CONSTRUCT THE GRAPH LAPLACIAN, L = D^(-1/2) A D^(-1/2)
        3. FIND e_1, e_2, e_3...e_k, THE k LARGEST EIGEN VECTORS OF L, AND FORM THE MATRIX
           X = [e_1, e_2, e_3...e_k]
        4. THE "SPECTRUM", S IS FORMED BY RENORMALIZING EACH ROW OF X
```

$$S_{ij} = \frac{X_{ij}}{\sqrt{\Sigma_j X_{ij}^2}}$$

FIG. 6

FUNCTION FUZZY CLUSTER ASSIGNMENT
    INPUTS:
        1. CLUSTER PROBABILITY MATRIX P (OUTPUT OF FCM ALGORITHM)
        2. DESIRED NUMBER OF CLUSTERS K
    PROCEDURE:

FOR EACH RECORD $P_i$ IN P

SYSTEM FOR CO-CLUSTERING OF STUDENT ASSESSMENT DATA

The present disclosure relates to multifunction device systems and methods for evaluating student assessment data, and in particular, for utilizing formative assessment data in order to identify co-clusters of students and metadata associated therewith that are displayed and/or printed on the multifunctional device system.

In recent years the basic office copier has evolved into what can be called a "multi-function device" or MFD. With digital technology, a machine with the basic outward appearance of a traditional copier can perform additional functions such as printing documents submitted in digital form over a network; sending and receiving messages via facsimile; recording hard-copy original images in digital form and sending the resulting data over a network, such as in electronic mail; or recording hard-copy original images in digital form on a compact disc or equivalent medium. These additional functions present further challenges to a designer of a convenient and intuitive user interface.

The present disclosure is directed utilizing MFDs to creating, grading, and analyzing the results of tests administered to students, and in particular, to a computer-implemented educational assessment system and method for generating and administering student assessments, evaluating the results thereof to enable educators to identify strengths and weaknesses of students both individually and in the aggregate, and tailoring the learning experience of students in a classroom environment.

The present disclosure relates to the process of assessing the attributes of a student or group of students at selected times during their learning process and particularly relates to the assessment and evaluation of student attributes or progress in a structured classroom where a teacher is required to educate the students to a level of proficiency in various subject matters and at particular grade levels. Typically, in a grade level classroom, the teacher periodically gives the students printed formative assessments or tests, as they have previously been referred to, in order to obtain an indication of the student(s) level(s) of proficiency in the subject matter of immediate interest.

Where a teacher is responsible for a class having a relatively large number of students, the teacher typically passes out to all students a common assessment form. The assessments are distributed to the students who then mark their responses on the forms which are then gathered by the teacher and individually reviewed and evaluated or graded by the teacher. The process has required the teacher to then manually enter an overall metric of each student's performance on the assessment into a record book or database. Typically the metric is a single total score or percentage of possible points. This process has thus been time consuming and often requires the teacher to spend considerable time outside of the classroom performing these functions. Furthermore, no detailed record is kept regarding how each student performed on each item within the assessment. Given the low resolution metric recorded for each assessment, the recorded results do not fully or meaningfully determine the state of learning of individual students who may be experiencing learning difficulties or are insufficiently prepared for particular elements of the assessment.

Currently formative assessments are widely used in schools to close the gap between the current and the desired state of learning of a student. They are used by teachers as a feedback mechanism to assess the effectiveness of their instruction. Highly granular data on the performance of the students on a formative assessment can be captured. However, the data can be useful only if some actionable insights can be extracted from it and presented to the teachers, parents and students alike. One such view that can be extracted from the data is the information regarding clusters of students and the problem areas specific to each student cluster.

Thus, it has been desired to provide a way or means of automatically evaluating educational assessments to further enhance education needs for groups of students.

BRIEF DESCRIPTION

The following presents a simplified summary in order to provide a basic understanding of one or more aspects of the disclosure. This summary is not an extensive overview and is neither intended to identify key or critical elements, nor to delineate the scope thereof. Rather, the primary purpose of the summary is to present some concepts of the disclosure in a simplified form as a prelude to the more detailed description that is presented later.

In one embodiment, a system for educational assessment of student groups is provided. The system includes a processor having a memory, wherein the processor has a clustering engine that includes a student identification module that identifies student clusters and associated metadata having characteristics of each of the student clusters. The clustering also includes an assessment identification module identifies assessment data clusters among assessment data for students belonging to the student clusters, which is performed concurrent with the student identification module identifying student clusters. A display module compiles the metadata related to the student clusters and the assessment data clusters, and provides relationships between the student clusters and the assessment data clusters with the metadata in a visible medium.

In another embodiment, a system for educational assessment of students is disclosed that comprises a processor having a memory, wherein the processor has a clustering engine that includes a student identification module that identifies student clusters based on metadata having characteristics of students within each student cluster and is associated with a hierarchy of assessment data of one or more formative assessments. The hierarchy of assessment data is related to different levels of demonstrated knowledge by students based on the formative assessments. A display module that compiles the metadata related to the student clusters and the assessment data clusters, and provides relationships between the student clusters and the assessment data clusters with the metadata to a visible medium in response to co-clustering of student data and assessment data. The student clusters are assigned to hard clustering so that each student is associated with only one student cluster and the assessment data is assigned to soft clustering so that the assessment data is not confined to being associated with only one assessment cluster. In addition, the assessment data includes data related to student responses to assessment evaluations of each formative assessment and each assessment evaluation includes a question for evaluation of each student that is associable with more than one assessment cluster.

In yet another embodiment, a method for co-clustering student data and assessment data from formative assessments on a processor is disclosed. The processor has a memory storing executable instructions for the method. The method comprises transforming student data from formative assessments into one or more bipartite graphs and mapping adjacency relationships between the students and the assessment data by creating one or more adjacency matrices from the one or more bipartite graphs. The data is then clustered into student clusters and the assessment data from the formative assessments into assessment data clusters while extracting metadata pertaining to each student cluster. The metadata includes characteristics of students belonging to each student cluster as well as any additional data pertaining thereto.

The following description and annexed drawings set forth in detail certain illustrative aspects and implementations of this disclosure. These are indicative of only a few of the various ways in which the principles of the disclosure may be employed.

BRIEF DESCRIPTION OF THE DRAWINGS

FIG. 5 is one aspect of an exemplary embodiment of a transformation of student data into bipartite graphs according to the present disclosure;

FIG. 6 is one aspect of an exemplary embodiment of a decomposition algorithm according to the present disclosure;

FIG. 7 is one aspect of an exemplary embodiment of a fuzzy cluster assignment algorithm according to the present disclosure;

DETAILED DESCRIPTION

Figure 1:
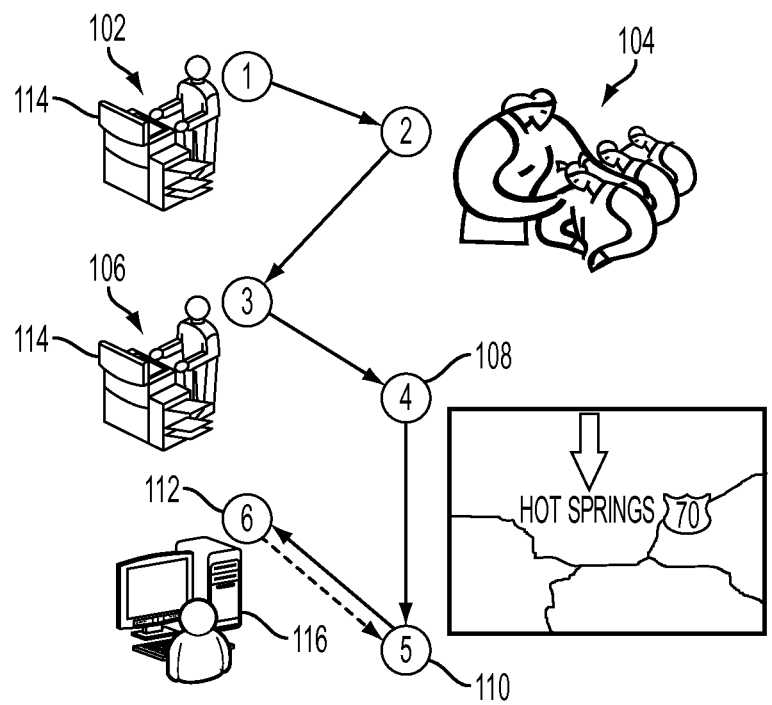
FIG. 1 is one aspect of an exemplary educational assessment system according to the present disclosure.

One or more implementations of the present disclosure will now be described with reference to the attached drawings, wherein like reference numerals are used to refer to like elements throughout.

Aspects of the exemplary embodiment relate to systems and methods to dynamically assess student data by automatically extracting actionable insights from assessment data as it is received and present the insights to the teachers, parents and students alike. One such view that can be extracted from the data is the information regarding clusters of students and the problem areas specific to each student cluster. Aspects of the systems and methods provide a co-clustering based approach to simultaneously discover student clusters as well as the defining characteristics of the cluster (e.g., questions that the students answered incorrectly, a specific concept which a set of students could not master, and/or an error mode common among the students). The assessment data can be accumulated in a highly granular detail with a system more detailed in a related U.S. application, namely U.S. Patent Publication Number 2010/0157345 by Robert M Lofthus et al, which is incorporated herein by reference in its entirety and reproduced in sections herein.

Referring to the drawings, FIG. 1 shows an illustration of an educational assessment system in accordance with the present disclosure. System 100 includes stages 102 through 112. A teacher and/or school administrator may utilize system 100. A teacher identifies herself to the MFD 114 during stage 102 by logging into system 100. The teacher can log into system 100 utilizing any authentication and/or security technology. For example, the teacher (or authorized user) can log into system 100 using a unique ID, a username, an RFID tag, a smart card, a passphrase, and the like. Additionally or alternatively, the teacher logs into MDF 114 using a touch-screen display. Several formative assessments are presented to the teacher so that she can choose among them to print. The chosen assessments are then printed during stage 102. Each formative assessment includes assessment data that includes information about the concepts, error modes and/or assessment evaluations therein. At stage 104, the teacher administers the formative assessments to one or more students. During stage 106, the teacher scans in or enters the data from the assessments into MDF 114. MDF 114 can convert the scanned assessment into a Page Description Language File, image data, and/or other format. MDF 114 and/or a server (not shown) may perform processing on the scanned assessments. During stage 108, the assessments are evaluated, e.g., an algorithm (not depicted) grades the assessments using a rubric (not depicted). Stage 108 evaluates the assessment by reviewing the human markings or answers to assessment evaluations (e.g., short questions, multiple choice, matching, essay and the like). The teacher may be notified by the algorithm that the assessments have been evaluated, e.g., via email, text message, a printed page and the like. During stage 110, the teacher can verify and/or correct how the assessments were graded using personal computer 116. During stage 112, the teacher requests reports about the formative assessment to design other assessments and/or to tailor the teaching of the students. Stages 110 and/or 112 may be repeated several times. In other embodiments, stages 102 through 110 may vary in sequence, some stages may be performed in a serial manner or a parallel manner, and/or some stages may be performed in a step-wise manner.

Figure 2:
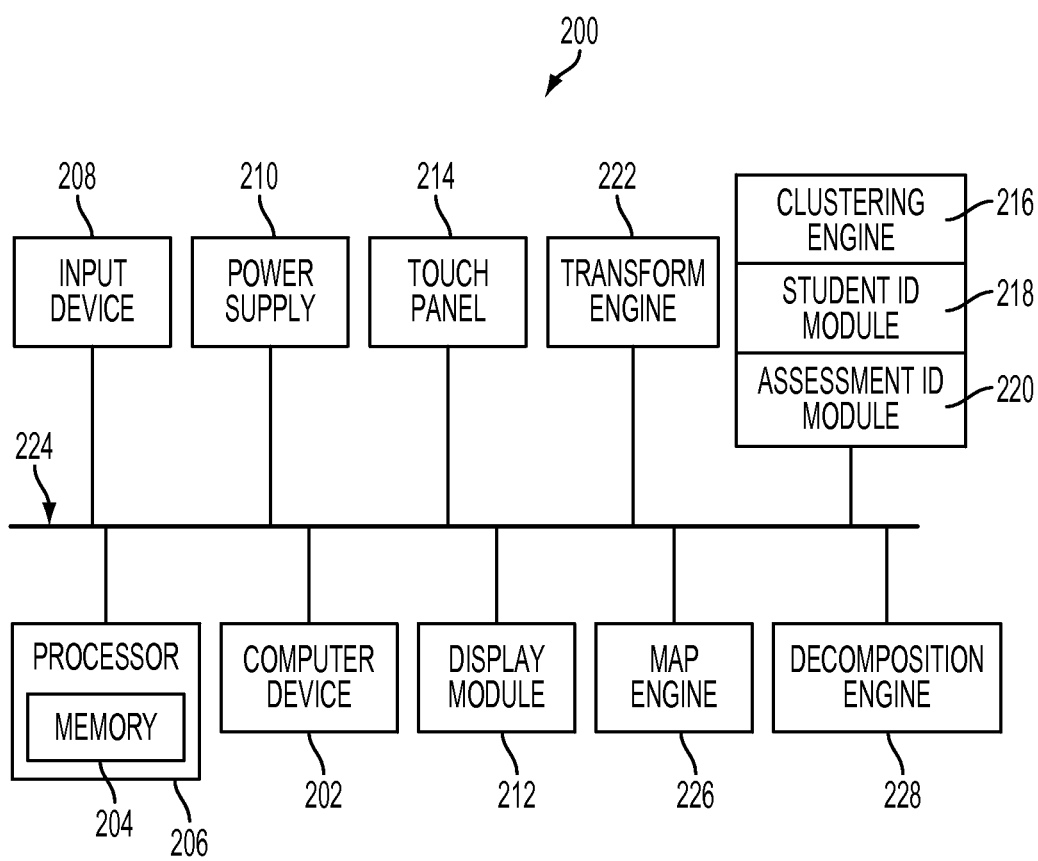
FIG. 2 is another aspect of an exemplary educational assessment system according to the present disclosure.

FIG. 2 illustrates one embodiment of an educational assessment system 200 for educational assessment of student groups by identifying clusters of students and concurrently determining the defining characteristics of each student cluster. A client device, such as a computer device 202 comprises a memory 204 for storing instructions that are executed via a processor 206. The system 200 may include an input device 208, a power supply 210, a display module 212 and/or a touch screen interface panel 214. The system 200 may also include a clustering engine 216 having a student identification (ID) module 218 and an assessment identification (ID) module 220. The system further includes a transformation engine 222, an adjacency mapping engine 226 and a decomposition engine 228 that are communicatively coupled. The system 200 and computer device 202 can be configured in a number of other ways and may include other or different elements. For example, computer device 202 may include one or more output devices, modulators, demodulators, encoders, and/or decoders for processing data.

A bus 224 permits communication among the components of the system 200. The processor 206 includes processing logic that may include a microprocessor or application specific integrated circuit (ASIC), a field programmable gate array (FPGA), or the like. The processor 206 may also include a graphical processor (not shown) for processing instructions, programs or data structures for assessment data from formative assessments provided to students.

The memory 204 may include a random access memory (RAM) or another type of dynamic storage device that may store information and instructions for execution by the processor 206, a read only memory (ROM) or another type of static storage device that may store static information and instructions for use by processing logic; a flash memory (e.g., an electrically erasable programmable read only memory (EEPROM)) device for storing information and instructions, and/or some other type of magnetic or optical recording medium and its corresponding drive.

The processor 206 drives the clustering engine 216, which includes the student identification module 218 and the assessment identification module 220. The student identification module 218 identifies student clusters and associated metadata that includes characteristics of students within each student cluster. For example, the characteristics may include data related to concepts, mastery of skills, problem areas, errors made, questions missed, and/or other characteristics related to assessment evaluations provided to each student within a student cluster. The assessment identification module 220 identifies assessment data clusters among assessment data for students belonging to the student cluster.

The transformation engine 222 compiles the assessment received from formative assessments provided to students and in turn, creates bipartite relationships in bipartite graphs of student data for each student and the assessment evaluations. The adjacency mapping engine 226 maps adjacency relationships between students and the assessment data by creating at least one adjacency matrix from the one or more bipartite graphs. The decomposition engine 228 performs a spectral decomposition on the adjacency matrices and establishes weighted distances for each relationship, which is further detailed infra.

Figures 3, 4:
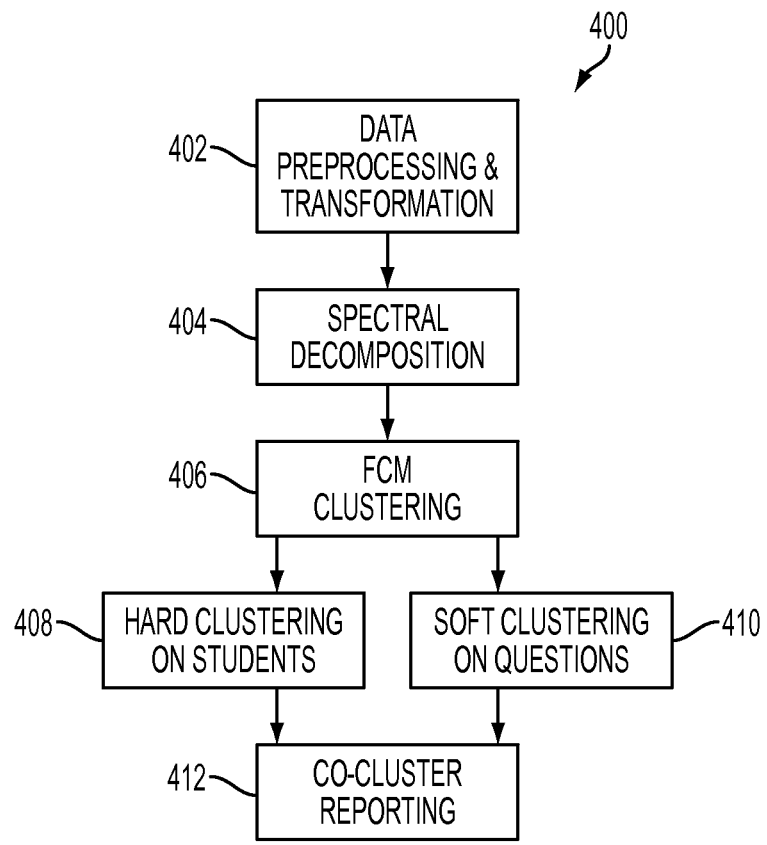
FIG. 3 is a clustering output provided by a clustering engine according to one aspect of an exemplary clustering engine in the present disclosure.
FIG. 4 is a flowchart detailing an exemplary method for generating student clusters and characteristics related to the student clusters from assessment data.

Referring now to FIG. 3, illustrated is an exemplary embodiment of an output 300 of a clustering engine, such as illustrated in the clustering engine 216 of FIG. 2 above that co-clusters student data into student clusters and assessment data into assessment data clusters in order to help teachers more easily identify clusters of students and the problem areas within these clusters, helping him or her to take remedial actions to address issues therein. The clustering engine 300 of FIG. 3 identifies clusters of students and simultaneously determines metadata for each cluster with characteristics of the student clusters (e.g. what questions or assessment evaluation do they most often get wrong). Other characteristics may also be identified from the formative assessments of the students, such as points of error (i.e., error modes), which indicate how or in what manner an error is being made. In addition, concept mastery and/or a standard/level of mastery can be part of the characteristics in the metadata related to the students and/or the student cluster that a student belongs to. For example, other characteristics may be a set of questions that the students answered incorrectly or a specific concept, which a set of students could not master.

An example of one output view 300 that is extracted from the data by the clustering engine is shown in FIG. 3. For example, the information regarding clusters of students and the problem areas specific to each student cluster can be extracted by a co-clustering based approach to simultaneously discover student clusters as well as the defining characteristics of the cluster (e.g. a set of questions that the students answered incorrectly or a specific concept, which a set of students could not master).

FIG. 3 shows the performance of five students 314 on a set of ten questions 312. "C" denotes a correct response; "W" denotes a wrong response and "S" a skipped response. The clustering engine 216 of FIG. 2, for example, utilizes clustering algorithms to identify the student clusters 306, 316 (in the above example {S1, S2} and {S4, S5}, respectively). This can be performed by a student identification module, discussed above, of the clustering engine 216, which may be implemented in either hardware and/or software. An assessment identification module further is driven by the clustering engine and also discussed above to cluster the assessment data, such as the question clusters 310, 308 ({Q2, Q3} and {Q7, Q8, Q9, Q10}, respectively). The clustering engine of the system is thus able to concurrently and simultaneously identify student and assessment data (e.g., question) co-clusters. Two co-clusters 302 and 304 are highlighted in this data. Students S1, S2 and Questions Q2, Q3 belong to the first co-cluster 302. Students S4, S5 and questions Q7, Q8, Q9 and Q10 represent another co-cluster 304. In this example the co-clusters with correct responses are trivial and are not highlighted. Although one example of co-clustering is shown other aspects of co-clustering data with different numbers of students and different forms and numbers of assessment data may also be envisioned as one of ordinary skill in the art can appreciate.

The co-clusters identified from the data can be used in several ways. It can help the teacher to easily identify clusters of students and the problem areas within these clusters, helping her or him to take remedial actions to address issues with a classroom. The co-clusters identified from a prior assessment could also help in automated generation of subsequent formative assessments.

An example methodology 400 for co-clustering student data and assessment data from formative assessments provided to students with a processor having a memory storing executable instructions for the method is illustrated in FIG. 4. While the method 400 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 400 is described in conjunction with other figures described herein for ease of explanation and example. However, the method 400 is not limited to any one aspect of an embodiment provided in the other figures. The method 400 initiates at 402 with data preprocessing and transformation of student groups and assessment data compiled from formative assessments. The preprocessing and transformation that could be performed by the transformation engine 222 of the educational assessment system 200 as described above for example. Preprocessing gathers the data from student assessments provided to the students. The student data is then formed into one or more bipartite graphs, which are illustrated further in FIG. 5.

Referring to FIG. 5, illustrated is a bipartite graph representing student data and assessment data with different relationships therebetween. Student performance data is represented as a bipartite graph at 402 of the method 400 by a transformation engine 222, for example. The different relationships that are created include student-item bipartite relationships as shown in the bipartite graph 502, student-concept relationships as shown in a bipartite graph 504, and student to error mode relationships as shown in a portion of a bipartite graph 506.

In one example, bipartite graph 502 illustrates the student-Item bipartite relationships formed by the transformation engine of the educational assessment system. The students (e.g., S1, S2, S3, S4 and S5) are represented by a square and the questions as circles. A line from the student to a question represents that the student gave an incorrect response to that question (or skipped that question).

In another example, bipartite graph 504 illustrates the student-concept bipartite relationship. When a formative assessment measures the student performance on multiple concepts (e.g. Addition, Long division etc.), the bipartite graphs may be formed in order to cluster students based on their performance in these concepts. Also here, the students are represented as square blocks and the concepts as circles. The weight between a student and the concept is the measure of student mastery of that particular concept. In addition, the length or distance of the line may represent a weight provided to the missed or skipped question for a weighted distance. Various other means may also be envisioned for representing the weight of the relationships. In one embodiment, the weights may be varied, either manually or via user interface controls of the system. Therefore, certain concepts proving more difficult or taught with more stress could be evaluated differently in relation to other relationships shown in the graph.

Referring again to FIG. 4, the method 400 at 402 continues to pre-process and transform assessment data compiled from formative assessments of students by creating adjacency relationships from the bipartite graphs shown in FIG. 5, for example. An adjacency mapping engine 226 as shown in FIG. 2 maps the relationships between students and the assessment data from the bipartite graphs into matrices. This enables further decomposition of the data with algorithms at 404 of the method.

At 404 a decomposition of the adjacency matrices formed at 402 is performed by a decomposition engine 228, which performs a spectral decomposition on the adjacency matrices and establishes weighted distances for each relationship. For example, a spectral decomposition is performed with student data from the adjacency matrices. The "Spectrum" values of a graph are the eigenvalues of a graph ordered on the strength of their corresponding eigenvalues. The spectrum provides valuable insights into the connectivity of a graph. The objective of spectral decomposition of the adjacency data is two-fold: to estimate three different types of distances: Student-Student, Question-Question and Student-Question. The Student-Student distances and Question-Question distances are between homogenous entities only. By transforming the data into an adjacency representation and by applying spectral decomposition, in addition to the similarities between homogenous entities, the system 200, for example, is also able to compare the distances between dissimilar entities (e.g. students and questions). The weighted distances establish the amount of truth degree or probability for a connection between students and the student data, for example. Thus, the decomposition helps in co-clustering of students and questions. The data has high dimensionality and applying clustering on the raw data will suffer from the "curse of dimensionality", i.e., it will result in imprecise clusters. However, by applying spectral decomposition on the adjacency data, the system is able to focus on a few dimensions with the highest variability, and thus, results in more accurate clusters.

FIG. 6 illustrates one example of a mathematical pseudo code algorithm for a decomposition engine to perform a spectral decomposition on adjacency data. For example, a k number is defined for students clusters each having a group of students, which may cross schools, districts and/or various other population distributions of students. In addition, the adjacency matrix A, which was formed from one or more of the bipartite graphs of the transformation engine 222 is defined. A diagonal D Matrix is calculated from the sum of rows of A. Then a Laplacian graph L is constructed. The eigenvectors of the graph L are found and then a spectrum S is formed.

Referring back to FIG. 4, the method continues at 406 where a clustering algorithm is performed by a clustering engine on the data. One way to facilitate individualized learning experiences for a student is to group the student with other students having similar problem areas as seen from the administration of a formative assessment. The co-clustering is based on the Fuzzy-C-Means (FCM) clustering algorithm. The FCM algorithm takes the spectrum S, and the value k (desired number of clusters) as inputs and for each record S, (which can represent either a student or question) generates cluster membership probabilities, $P_i = \{p_1, p_2, \ldots, p_k\}$, where $p_x$ represents the probability that the record belongs to a cluster x. The fuzzy cluster assignment algorithm is shown in FIG. 7. The algorithm assigns students to one among the k clusters (e.g., hard clustering basis), but it can assign questions to multiple clusters (e.g., soft clustering basis) based on their membership probabilities. At 408 hard clustering is done on student data and at 410 concurrently soft clustering is done on questions.

Figure 8A:
FIG. 8 is one aspect of an exemplary embodiment for reporting co-clustering according to the present disclosure.
Figure 8B:
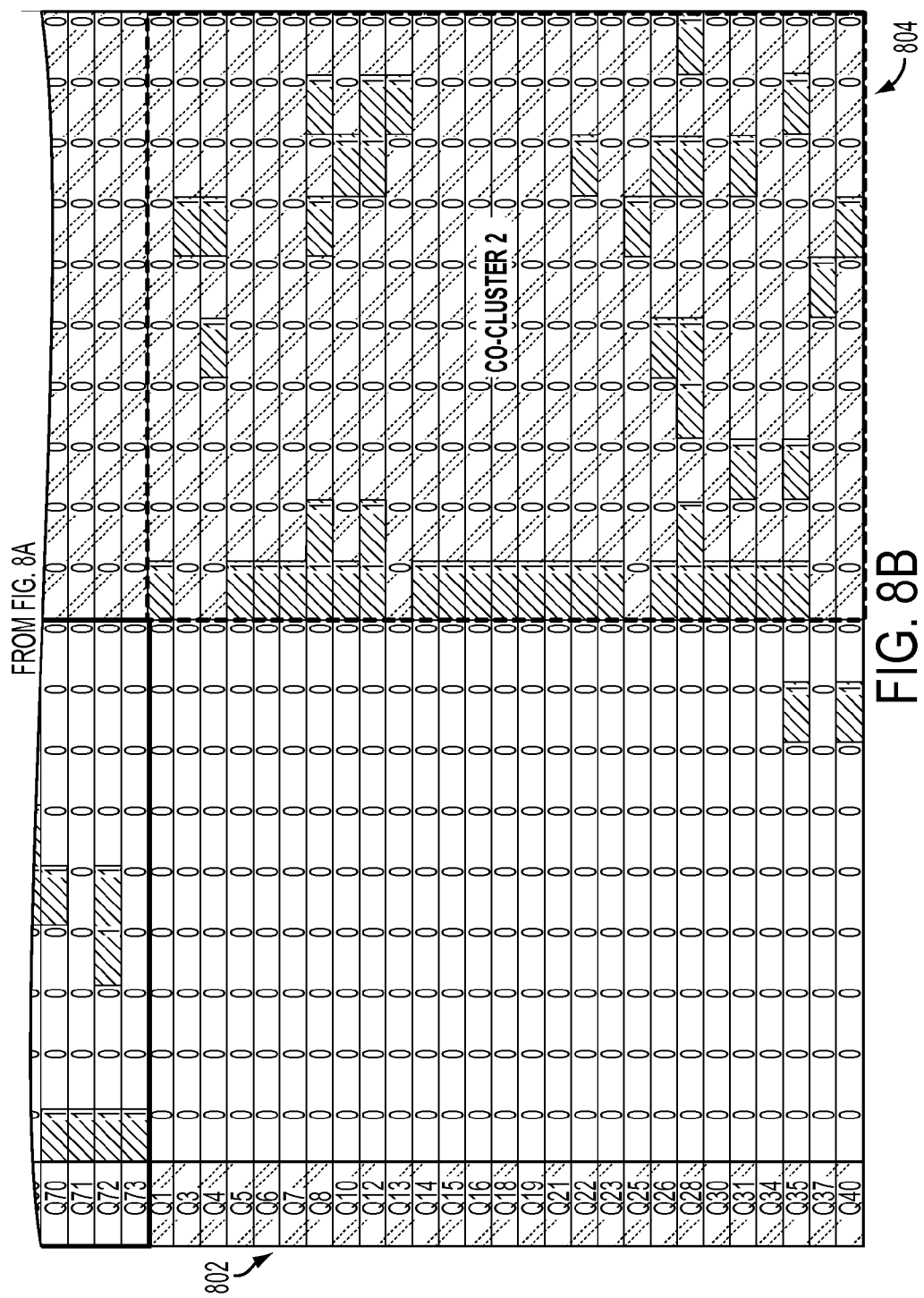
Figure 9:
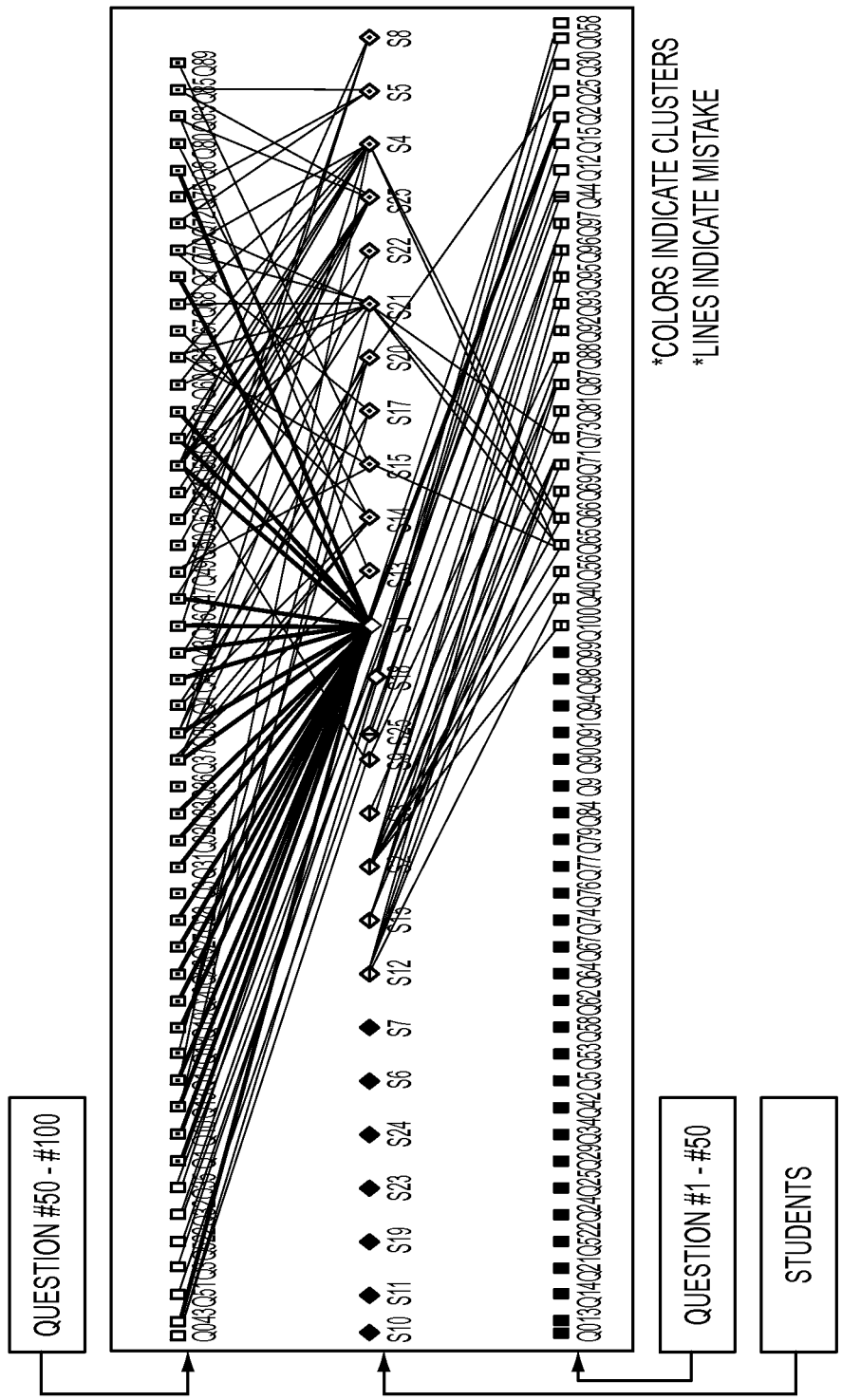
FIG. 9 is another aspect of an exemplary embodiment for reporting co-clustering according to the present disclosure.

At 412 reporting of the co-clustering data is performed in a display and/or at a visible medium. Examples of the reporting of co-cluster information are illustrated at FIGS. 8-9. At FIG. 8 questions are provided in the vertical left side column 802 and students along a horizontal top row 804. Co-clusters of data are shown in the top left quadrant (Co-cluster 1) between a group of students and questions missed. Further clustering can also be performed within the data to obtained more finely tuned levels of knowledge and skills so that clusters are formed within clusters of students. For example, if particular assessment evaluations are multiple-choice, students may also be clustered according to the answer they provide or the error mode of the student despite whether the answer is correct or not. Certain errors may indicate where guidance is needed among a subject matter or how misunderstanding is occurring with a particular topic. Co-cluster 2, for example, illustrates a different co-cluster of student data pertaining to a different set of questions. The highlighted portions of each co-cluster (Co-cluster 1 and 2) represent incorrect answers corresponding to the students. The reporting illustrated in FIG. 8 thus illustrates how co-clustering of data can be easily visualized. Another embodiment for reporting co-clustering of student and assessment data is illustrated in FIG. 9. Here, different colors or other patterns indicate the different clusters and lines from question to student indicate the different mistakes among students.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is, in turn, capable of implementing the flowchart shown herein.

The methods illustrated and related herein may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for educational assessment of student groups, comprising:
    a processor; and
    a non-transitory computer readable memory storing instructions that are executable by the processor to include:
    a clustering engine that includes a student identification module that identifies student clusters and associated metadata having characteristics of each of the student clusters, and an assessment identification module that concurrently identifies assessment data clusters among assessment data for students belonging to the student clusters;
    a transformation engine that compiles the assessment data from formative assessments provided to the plurality of students and creates bipartite graphs of student data for each student and assessment evaluations from the assessment data;
    an adjacency mapping engine that maps adjacency relationships between the students and the assessment data by creating at least one adjacency matrix from the bipartite graphs;
    a decomposition engine that performs spectral decomposition on the adjacency matrix and establishes weighted distances for each relationship, wherein the decomposition engine is configured to estimate distances between homogenous groups of data and dissimilar groups of data among the student data and the assessment data, wherein homogenous groups include student data and student clusters, and assessment data and assessment clusters, and dissimilar groups include a combination of the homogenous groups; and
    a display module that compiles the metadata related to the student clusters and the assessment data clusters, and provides relationships between the student clusters and the assessment data clusters with the metadata in a visible medium.

2. The system of claim 1, wherein the student clusters are assigned to hard clustering and the assessment data is assigned to soft clustering.

3. The system of claim 1, wherein the characteristics corresponding to the student clusters include problem subject matter areas for each student cluster.

4. The system of claim 2, wherein the adjacency mapping engine transforms the bipartite graph into adjacency matrices that identifies the relationships of students to questions, concepts, and error modes related to the assessment data of the formative assessments.

5. A method for co-clustering student data and assessment data from formative assessments on a processor having a non-transitory computer readable memory storing executable instructions for the method, comprising:
    transforming student data from formative assessments into one or more bipartite graphs;
    mapping adjacency relationships between the students and the assessment data by creating one or more adjacency matrices from the one or more bipartite graphs;
    simultaneously clustering the student data into student clusters and the assessment data from the formative assessments into assessment data clusters while extracting metadata pertaining to each student cluster and having characteristics of students belonging to each student cluster;
    decomposing each adjacency matrix with a spectral decomposition algorithm and establishing weighted distances for the relationships, wherein one or more of the weighted distances are adjustable by a user and are between homogenous groups of data and dissimilar groups of data among the student data and the assessment data, wherein homogenous groups include student data and student clusters, and assessment data and assessment clusters, and dissimilar groups include a combination of the homogenous groups; and
    compiling the metadata related to the student clusters and the assessment data clusters, and providing relationships between the student clusters and the assessment data clusters with the metadata in a visible medium.

* * * * *